(12) United States Patent
Boaz et al.

(10) Patent No.: US 12,252,918 B1
(45) Date of Patent: Mar. 18, 2025

(54) VEHICLE DOOR SYSTEM AND METHOD OF OPERATION

(71) Applicant: REE Automotive Ltd., Kibbutz Glil-Yam (IL)

(72) Inventors: Amos Boaz, Kibbutz Glil-Yam (IL); Andrea Di Francescantonio, Leamington Spa (GB)

(73) Assignee: REE AUTOMOTIVE LTD, Kibbutz Glil Yam (IL)

(*) Notice: Subject to any disclaimer, the term of this patent is extended or adjusted under 35 U.S.C. 154(b) by 361 days.

(21) Appl. No.: 17/695,523

(22) Filed: Mar. 15, 2022

Related U.S. Application Data (60) Provisional application No. 63/161,491, filed on Mar. 16, 2021.

(51) Int. Cl.
*B60J 5/04* (2006.01)
*E05D 15/06* (2006.01)
*E05D 15/40* (2006.01)

(52) U.S. Cl.
CPC ........ *E05D 15/0608* (2013.01); *B60J 5/0472* (2013.01); *B60J 5/0498* (2013.01); *E05D 15/40* (2013.01); *E05Y 2201/624* (2013.01); *E05Y 2201/684* (2013.01); *E05Y 2900/531* (2013.01)

(58) Field of Classification Search
CPC ... E05D 15/0608; E05D 15/40; E05D 15/403; E05Y 2201/624; E05Y 2201/684; E05Y 2900/531; B60J 5/047; B60J 5/0472; B60J 5/0497; B60J 5/0498; B60J 5/06; B60J 5/062; B60J 5/0486
USPC ......... 49/226, 227, 232, 234, 235, 372, 381, 49/382, 221, 223, 360; 296/147, 149, 296/155, 202
See application file for complete search history.

(56) References Cited

U.S. PATENT DOCUMENTS

| | | | | |
|---|---|---|---|---|
| 436,493 | A | * 9/1890 | Boone | B60N 2/3095 |
| | | | | 296/63 |
| 2,628,860 | A | * 2/1953 | Darrin | B60J 5/06 |
| | | | | 49/98 |
| 2,658,792 | A | * 11/1953 | Scott | B60J 5/06 |
| | | | | 49/300 |

(Continued)

FOREIGN PATENT DOCUMENTS

DE 102018000952 B4 * 2/2020

OTHER PUBLICATIONS

Awesgall, Youtube, Letter Carrier (mailman) Delivery—Time Lapse, Feb. 22, 2014 (Year: 2014).*

(Continued)

*Primary Examiner* — Amy R Weisberg
*Assistant Examiner* — Wenwei Zhuo
(74) *Attorney, Agent, or Firm* — Momentum IP; Marc Van Dyke (57) ABSTRACT

A vehicle comprises a side wall shaped to define a door opening and a door-exclusion zone. The door-exclusion zone has a maximum height that is higher than a bottom edge of the door opening and lower than a top edge of the door opening. The vehicle also includes a rail joined to a major surface of the side wall, an arm assembly pivotably anchored at a first end thereof to the side wall, and a door having a closed-door position aligned with the door opening. A first portion of the door is slidably engaged with the rail and a second portion of the door is pivotably coupled to a second end of the arm assembly.

7 Claims, 11 Drawing Sheets

(56) References Cited

U.S. PATENT DOCUMENTS

| | | | | | |
|---|---|---|---|---|---|
| 5,383,304 | A | * | 1/1995 | Codina Soley | E05F 15/646 49/210 |
| 5,992,918 | A | * | 11/1999 | Gobart | B60J 5/0473 296/146.13 |
| 6,030,025 | A | * | 2/2000 | Kanerva | E05D 3/147 49/248 |
| 7,438,346 | B1 | * | 10/2008 | Breed | E05C 17/203 296/146.12 |
| 8,292,349 | B1 | * | 10/2012 | Li | B60J 5/062 49/360 |
| 2006/0267375 | A1 | * | 11/2006 | Enomoto | E05F 15/646 296/155 |
| 2007/0120395 | A1 | * | 5/2007 | Geyrhofer | E05D 15/582 296/146.11 |
| 2019/0061489 | A1 | * | 2/2019 | Hoggarth | B60J 5/06 |
| 2021/0079703 | A1 | * | 3/2021 | Yun | E05D 15/0621 |

OTHER PUBLICATIONS

Halberitter (DE 102018000952 B4), machine translation (Year: 2020).*

* cited by examiner

SIDE VIEW

END VIEW

VEHICLE DOOR SYSTEM AND METHOD OF OPERATION

CROSS-REFERENCE TO RELATED APPLICATIONS

This patent application claims the benefit of U.S. Provisional Patent Application No. 63/161,491 filed on Mar. 16, 2021, which is incorporated herein by reference in its entirety.

FIELD AND BACKGROUND OF THE INVENTION

The present invention relates to vehicles having doors and, more particularly, to methods and systems for opening and closing doors next to a vehicle wheel well.

A conventional vehicle door is typically hinged at the edge of the door and allows the door to swing outward from the hull of the vehicle. Sliding plug doors open by sliding horizontally. Such doors are used on commercial vans, trains and other vehicles and allow a large opening for passengers to enter or exit without obstructing access. Coach doors may have one or two panels, opened outside the vehicle hull. Inward gliding doors combine rotary and linear movements to slide the door wings to the side of the doorway as they open.

A vehicle door which is located adjacent to a wheel well requires a door-opening mechanism that prevent the restriction of the door movement by portions of the wheel well. The wheel well and/or wheel assembly may extend in a direction, such as vertically, or horizontally such that the door may have limited space of opening/closing operation. For example, sliding of the door toward the direction of the wheel well may be limited up to the wheel well. This may limit the size of the opening, require increasing the distance between the door and the wheel well, or to define a door movement that overcomes the obstacle of the wheel well.

Patent EP 3342609 discloses "A door for a vehicle comprising a first panel and a second panel, in which in a closed position of the door, the first panel is positioned vertically above the second panel so that a lower edge of the first panel touches an upper edge of the second panel characterized in that, in an open position of the said door, the second panel is arranged so as to be completely superimposed over the first panel so that a lower edge of the second panel is positioned in front of a lower edge of the first panel, the lower edges of the two panels being positioned vertically above a wheel of the said vehicle, the first panel being configured to move laterally with respect to a lateral wall of the vehicle until it is above the said wheel".

SUMMARY

According to embodiments disclosed herein, a vehicle comprises: (a) a side wall shaped to define a door opening and a door-exclusion zone, the door-exclusion zone having a maximum height that is higher than a bottom edge of the door opening and lower than a top edge of the door opening; a rail joined to a major surface of the side wall; an arm assembly pivotably anchored at a first end thereof to the side wall; and a door having a closed-door position aligned with the door opening, a first portion of the door being slidably engaged with the rail and a second portion of the door being pivotably coupled to a second end of the arm assembly, the arm assembly and the rail being arranged to constrain movement of the door between the closed-door position and an open-door position higher than the door-exclusion zone, to a travel-path that does not impinge upon the door-exclusion zone.

In some embodiments, the open-door position is at least partly above the door-exclusion zone.

In some embodiments, the door movement constrained to the travel-path can include, in a door-opening mode, an upward vector and a longitudinal vector toward the door-exclusion zone, and/or, in a door-closing mode, a downward vector and a longitudinal vector away from the door-exclusion zone.

In some embodiments, in the closed-door position, a bottommost portion of the door can be below or at the same height of at least a portion of the door-exclusion zone.

In some embodiments, the door opening can be disposed between the door-exclusion zone and an end of the vehicle nearest to the to the door-exclusion zone, and/or the door movement constrained to the travel-path can include, in a door-opening mode, a longitudinal vector away from the end of the vehicle nearest to the door-exclusion zone.

In some embodiments, the side wall can be formed to include a door pocket therewithin, the major surface can be a major internal surface of the door pocket, and/or the arm assembly can be pivotably anchored at a first end thereof within the door pocket.

In some embodiments, the travel-path can be disposed entirely within a volume consisting of the doorframe and the door pocket.

In some embodiments, the door-exclusion zone can include a wheel well.

In some embodiments, the door movement constrained to the travel-path can be caused by a force applied at the first portion of the door.

In some embodiments, the door movement constrained to the travel-path can be caused by a force applied at the second portion of the door.

In some embodiments, the rail can have an arcuate shape.

In some embodiments, the vehicle can comprise a second rail, a third portion of the door being slidably engaged with the second rail.

A method is disclosed, according to embodiments, for operating a vehicle that comprises: (i) a side wall shaped to define a door opening and a door-exclusion zone, the door-exclusion zone having a maximum height that is higher than a bottom edge of the door opening and lower than a top edge of the door opening, (ii) a rail joined to a major surface of the side wall, (iii) an arm assembly pivotably anchored at a first end thereof to the side wall, and (iv) a door comprising a first portion slidably engaged with the rail and a second portion pivotably coupled to a second end of the arm assembly. The method comprises: (a) opening the door by moving the door from a closed-door position aligned with the door opening to an open-door position higher than the door-exclusion zone, along a travel-path constrained by arrangement of the arm assembly and rail to avoid impingement upon the door-exclusion zone; and (b) closing the door by moving the door along the travel-path from the open-door position to the closed-door position.

In some embodiments, it can be that (i) the opening includes (A) moving the door in a downward vector and (B) moving the door in a lateral vector away from the door-exclusion zone, and/or (ii) the closing includes: (A) moving the door in an upward vector and (B) moving the door in a lateral vector toward the door-exclusion zone.

In some embodiments, the method can additionally comprise, after the opening: entering the vehicle through the door opening.

In some embodiments, the method can additionally comprise, after the opening, driving the vehicle while the door is secured in the open-door position.

In some embodiments, the method can additionally comprise, after the closing: driving the vehicle while the door is secured in the closed-door position.

In some embodiments, the side wall can be formed to include a door pocket therewithin, the major surface can be a major internal surface of the door pocket, and/or the arm assembly can be pivotably anchored at a first end thereof within the door pocket.

In some embodiments, the travel-path can be disposed entirely within a volume consisting of the doorframe and the door pocket.

According to embodiments disclosed herein, a vehicle comprises: (a) a side wall shaped to define a door opening and a door-exclusion zone, the door-exclusion zone having a maximum height that is higher than a bottom edge of the door opening and lower than a top edge of the door opening; (b) an arm assembly pivotably anchored at a first end thereof to the side wall; and (c) a door having a closed-door position aligned with the door opening, the door being pivotably coupled to a second end of the arm assembly, the arm assembly being actuatable to open the door to an open-door position higher than and at least partly above the door-exclusion zone.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. It is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

A vehicle according to embodiments comprises a door system that facilitates opening the door. The opening is by sliding the door upwards and toward a door-exclusion zone so as to reach an open-door position higher than the door-exclusion zone and at least partly above the door exclusion zone. The term 'above' as used herein is synonymous and interchangeable with 'at least partly above'; both terms mean 'higher than and at least partly vertically aligned with.' Similarly, the system facilitates closing the door. The closing is by sliding the door downwards and away from the door-exclusion zone so as to reach the closed-door position, e.g., in a door opening. A 'door system' as the term is used herein includes the door as well as hardware elements including door arm assemblies (or, equivalently, arm assemblies) and/or rails which guide and/or constrain the movement of a door along a travel path. The travel path (or, equivalently, travel-path) is a pre-designed route for travel of a door, e.g., between an open-door position and closed-door position. The travel-path can be effective to constrain door movement in a door-opening mode, i.e., when the movement is from a closed-door position to an open-door position, to a route that includes both an upward vector and a lateral vector toward the door exclusion zone and away from a door opening. The travel-path can also be effective to constrain door movement in a door-closing mode, i.e., when the movement is from an open-door position to a closed-door position, to a route that includes both a downward vector and a lateral vector away from the door exclusion zone and toward the door opening. A 'door opening' as used herein means a doorframe or similar structural opening in a wall of a vehicle in which a door is housed when in a closed-door position.

Figure 1A:
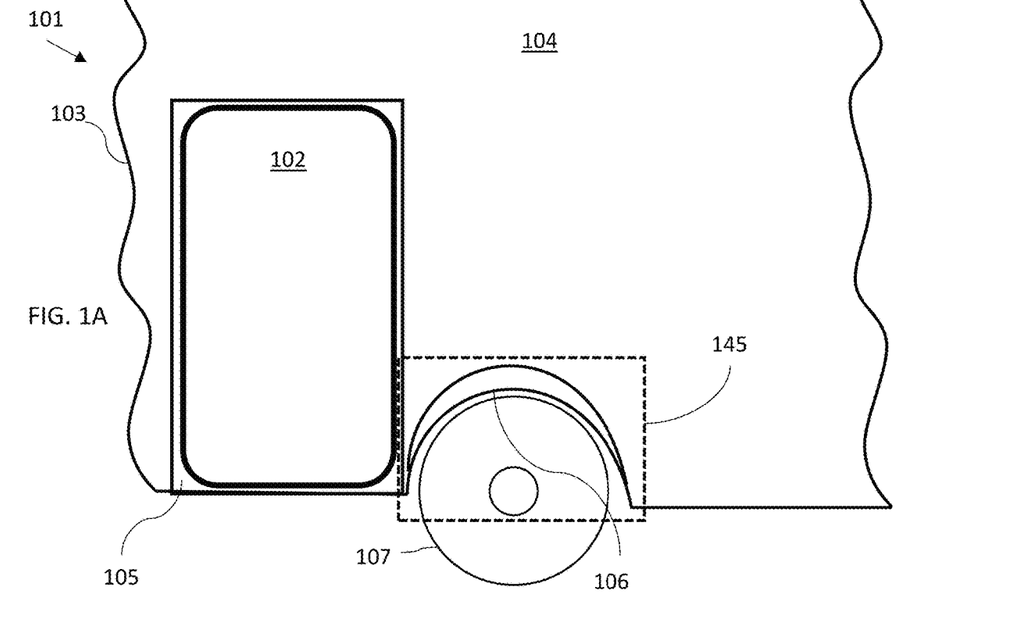
FIG. 1A is a is a schematic illustration showing a vehicle having a door-exclusion zone comprising a wheel well, according to embodiments of the invention.
Figure 1B:
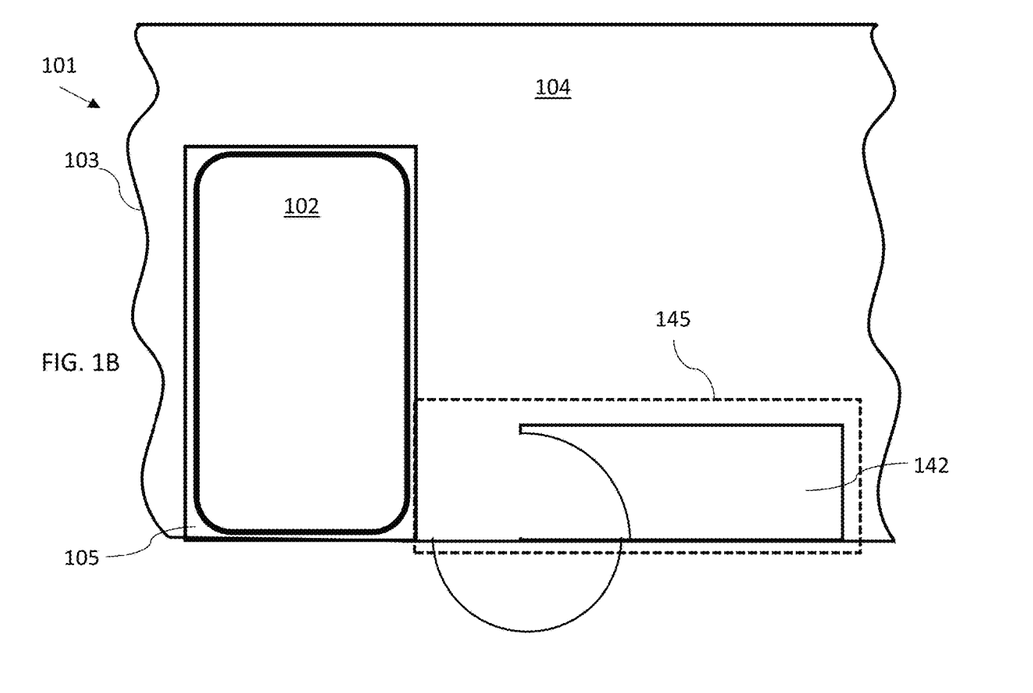
FIG. 1B is a is a schematic illustration showing a vehicle having a door-exclusion zone comprising a cargo compartment, according to embodiments of the invention.

Referring to FIGS. 1A and 1B, non-limiting examples of door-exclusion zones are illustrated. FIG. 1A shows a door-exclusion zone 145 comprising a wheel well 106. FIG. 1B shows a door-exclusion zone 145 comprising a luggage or cargo compartment 142. In another non-limiting example (not shown), a door-exclusion zone comprises an air conditioning unit or a component thereof. Any volume of a vehicle may be designated as a door-exclusion zone. The nature of a door exclusion zone as the term is used herein is that a door is excluded from impinging upon the volume of the door-exclusion zone, the exclusion being based on physical constraints and/or operating instructions. For example, it can be that a door sliding within the interior volume of a vehicle cannot pass through a wheel well because the floor of the vehicle above the wheel well physical prevents it. In another example, it can be that a door sliding through an interior pocket volume of a vehicle wall is not allowed to pass through an area of the interior pocket volume that houses sensitive wiring or equipment. Any discussion relating to a wheel well throughout the present disclosure is meant to be illustrative of door-exclusion zones and therefore such discussion applies to any type of door-exclusion zone such as those mentioned in the paragraph.

The door system, according to some embodiments, potentially allows opening of the door by sliding toward the wheel well, potentially reduces the distance between the wheel well and the door, and potentially reduces the protrusion of the door in an open state towards the outside (for example as in typical sliding door on a rail outside the body, or hinged door) and/or the inside direction of the body (e.g. like in of bus folding or gliding doors).

According to some embodiments, there is provided a vehicle door system, adapted to be accommodated adjacent to a vehicle well and to open by moving towards the wheel well, while a portion of the door system is guided above the wheel well. In some embodiments, moving is by sliding the door longitudinally in a longitudinal direction of the vehicle and vertically, such the door in an open state is positioned vertically above at least a portion of the wheel well.

According to some embodiments, there is provided a vehicle having a body, a door opening, a door, an arm assembly connected to the door and to a wall of the body, and a wheel well. According to some embodiments, the door opening is located at a wall defined in one side of the body in front of the wheel well, e.g. between the front edge of the vehicle and the front wheel well, and the arm assembly is adapted to open the door by moving backward towards the front wheel well. According to some embodiments, the door opening is located at a wall defined at one side of the body behind the wheel well a wheel well, e.g. between the rear edge of the vehicle and the rear wheel well, and opens by moving forward towards the rear well.

In some embodiments, an arm assembly is effective to manipulate the door from an open position to a closed position, and/or vice versa. In such embodiments, a force, e.g., an electrically, hydraulically or pneumatically generated force, or a manually applied force, is applied at a first end of an arm assembly that is connected to a vehicle surface and displaced from the door, so as to cause and regulate the movement of the door, e.g., by rotation of one or more arms of the arm assembly. In some embodiments, a powered or manual force is applied to the door, for example at a handle, or at a second end of the arm assembly that is connected to the door and displaced from the first end connected to the vehicle surface.

Words such as 'connected', 'attached' and affixed, or similar words, wherever used in the present disclosure should not be interpreted as being limiting as to the nature of the connection. They should be understood to mean either connected, etc., directly and/or indirectly, and either rigidly, i.e., fixedly, and/or pivotably. In an illustrative non-limiting example, a door portion may be said to be 'slidably connected; to a rail, where such connection can include additional hardware effective to maintain sliding contact between the door portion and rail. In a similarly illustrative and non-limiting example, an arm assembly (or an arm thereof) may be disclosed as being pivotably attached to a vehicle surface, and such a connection may include additional mediating hardware for facilitating the pivoting.

According to some embodiments, the door has an open state, a partial open state, and a closed state. In some embodiments, in the open state, the door is positioned to be at least partially vertically above the adjacent wheel well, i.e., such that the bottom of the door, and thus the entire door, is higher than the wheel well, as well as being partly aligned with the wheel well. According to some embodiments, at the closed state the bottommost portion of the door is positioned below or at the same height of at least a portion of the adjacent wheel well.

Some embodiments relate to a method for opening a vehicle door that is located next to a wheel well, between wells positioned at the same side of the vehicle, between all wells.

Some embodiments relate to doors having a closed-door position in a door opening located between an end of the vehicle and a door-exclusion zone. It can be desirable for the door to be moveable to an open-door position higher than the door-exclusion zone and at least partly above, i.e., at least partly aligned, with the door-exclusion zone. It can be desirable for the open-door position to be inside the vehicle, i.e., not outside, and in some embodiments it can be desirable for the open-door position to be inside a side wall of the vehicle, e.g., in a door-pocket within the thickness of the side wall of the vehicle, such that at least part, or a majority, or most, of the open door is not visible from inside the vehicle. Various non-limiting examples of doors and door assemblies having different features are illustrated in the figures; any of the features can be combined in any way within the scope of the embodiments. Any of the embodiments can practiced in such a way that a travel-path of a door is entirely or substantially within the interior volume or a vehicle. Additionally or alternatively, any of the embodiments can be practiced in such a way that a travel-path of a door is entirely or substantially or mostly within an interior volume of a side wall of the vehicle, e.g., in a door pocket that obscures some or most or all of the door when it is in an open-door position.

Reference is now made to FIGS. 2A-F.

FIGS. 2A-D schematically illustrate a side view of an interior portion of a vehicle and a door assembly according to embodiments. A vehicle door assembly 100 includes a door 102 and an arm assembly 110 coupled to door 102 for moving it between a closed state, a partially open state, and an open state. Door assembly 100 is adapted to be assembled to a vehicle body 103 adjacent to a wheel well 106, and or between the wheel well 106 and the nearest end of the vehicle body 103 (not shown). In the example of FIGS. 2A-D, the nearest end of the vehicle body 103 is to the left of the door opening 105 when viewing FIGS. 2A-D.

Figure 2A:
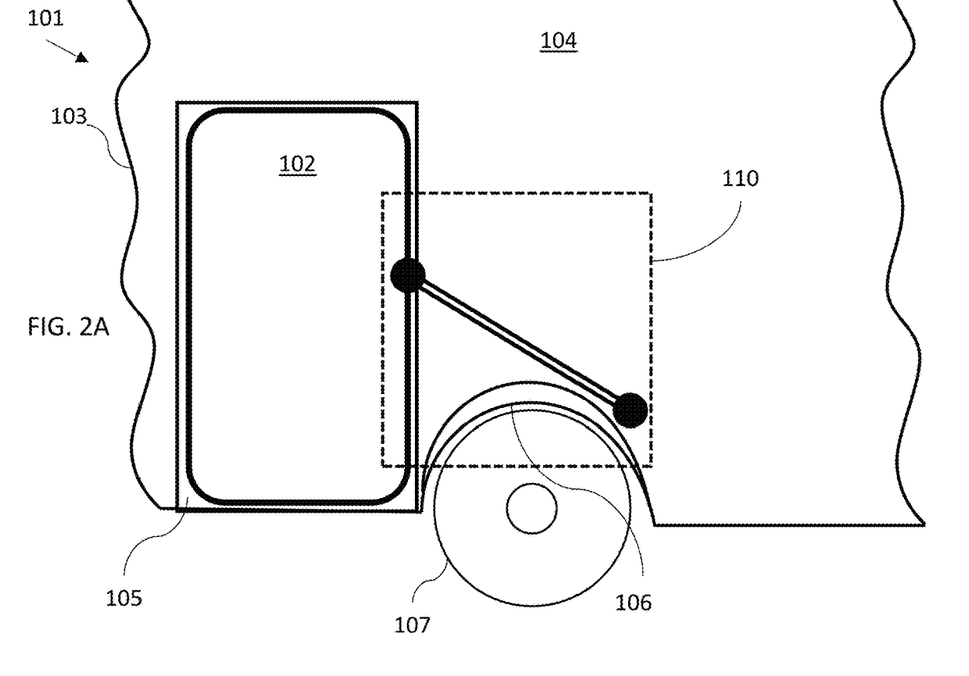
FIGS. 2A, 2B, 2C, 2D are schematic illustrations showing a vehicle comprising a door assembly, in successive stages of opening a door of the vehicle, according to embodiments of the present invention.
Figure 2B:
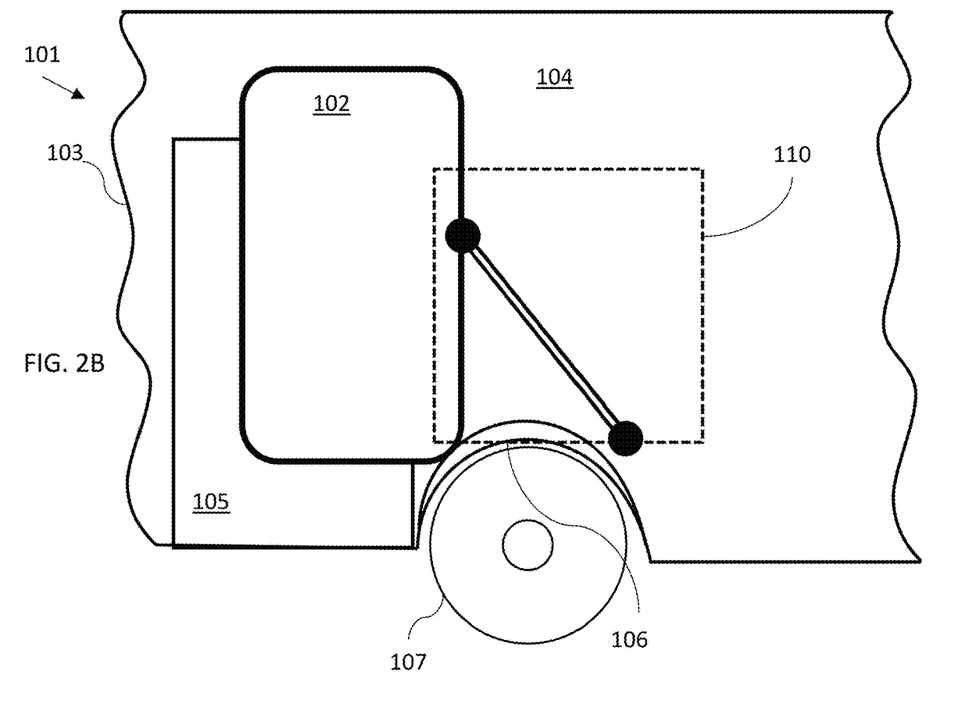
Figure 2C:
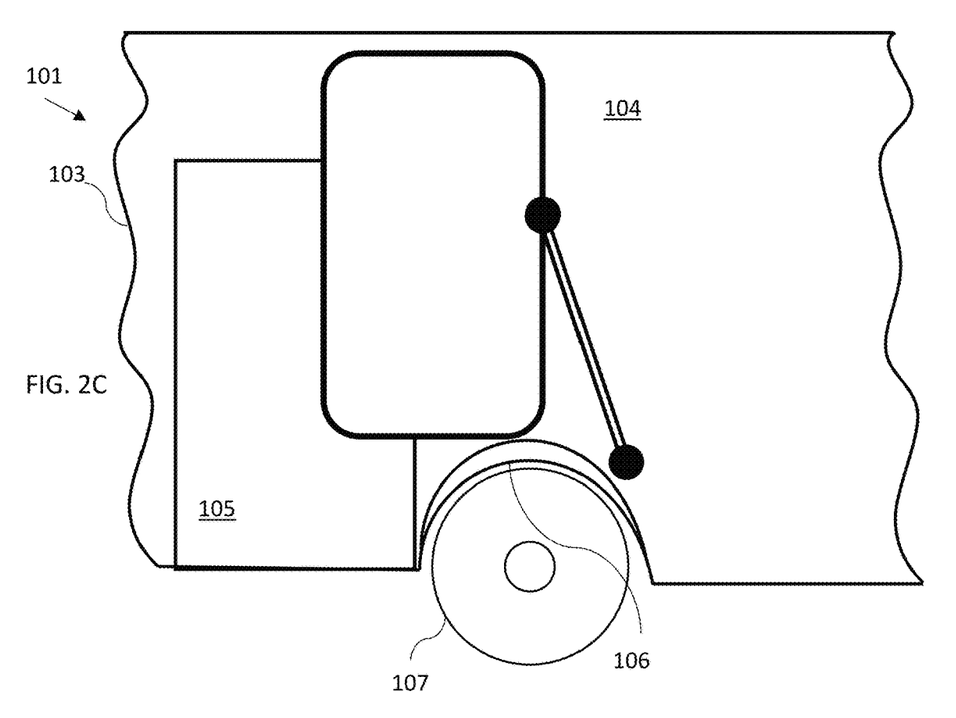

In FIGS. 2A-D, door 102 is shown while being opened, such that the four figures show successive positions of the door 102 and corresponding successive orientations of the arm assembly 110. In other words, FIGS. 2B and 2C show intermediate, or partly open positions, of the door 102 when being opened (or closed). Illustration of the door 102 being closed, i.e., moved from an open-door position to a closed-door position aligned with door opening 105, can be understood by viewing FIGS. 2A-D in reverse order.

According to some embodiments, moving of door 102 to the open state is by actuating the arm assembly 110 to move the door 102 towards the wheel well 106. Actuating can include, for example, providing a force (i.e., a torque) to the end 118 of the arm assembly 110 that is connected to the vehicle body 103. Additionally or alternatively, actuating can include providing a force to the door such that the end 118 of the arm assembly 110 that is connected to the vehicle body is passively rotated. For example, a handle (not shown) can be provided on the door 102 to facilitate manual opening and closing, where the range of motion of the door to and from the open-door position is defined by the end 116 of arm assembly 110 pivotably attached to the door 102. In some embodiments, moving to open state includes guiding a portion of the door system above wheel well 106. In some embodiments, a door end 116 of arm assembly 110 is connected to door 102, and body end 118 arm assembly 110 is adapted to connect to vehicle body 103.

Figure 2D:
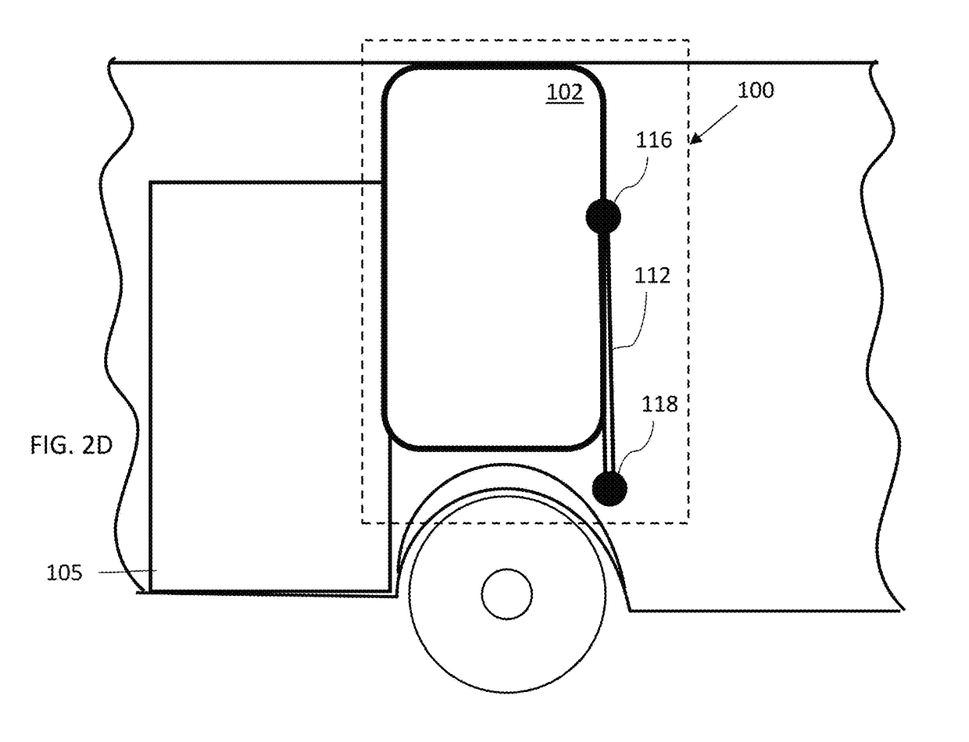
Figure 2E:
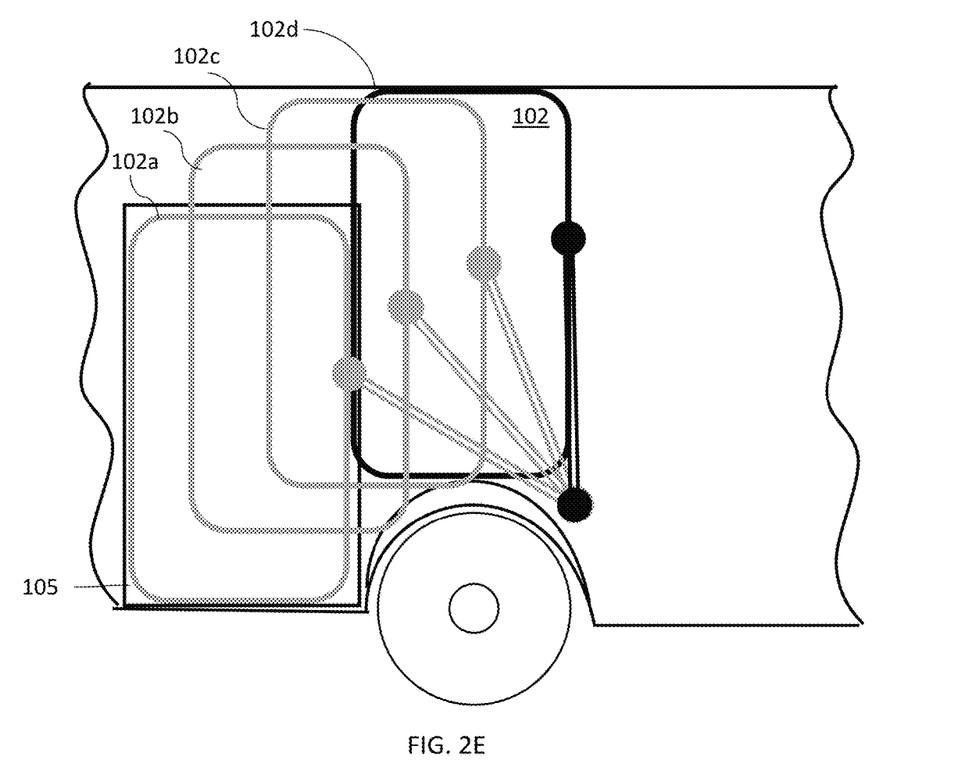
FIG. 2E is a schematic illustration indicating a travel path of the opened door of FIGS. 2A-D.

FIG. 2E shows each of the successive positions of door 102 from FIGS. 2A-D, shown respectively as door positions 102a, 102b, 102c, and 102d. Similarly, the corresponding successive orientations of the arm assembly 110 according to the non-limiting examples of FIGS. 2A-D are shown in FIG. 2E. The door 102 can be seen in FIG. 2E as having followed a travel-path constrained by arrangement of the arm assembly 110 to avoiding impingement of the wheel well 106 (or any other door-exclusion zone).

Figure 2F:
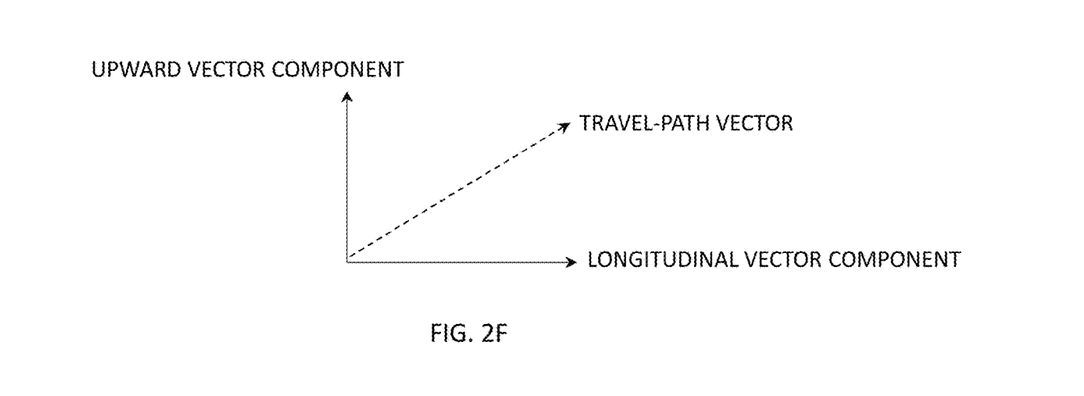
FIG. 2F shows a vector analysis of a portion of the travel path of FIG. 2E, according to embodiments of the invention.

According to embodiments, door assembly 100 is adapted to move door 102 by sliding door 102 in a combination of a longitudinal direction of vehicle and vertically. FIG. 2F shows a non-limiting example of a travel-path vector, e.g., corresponding to at least a portion of the travel-path illustrated in FIG. 2E, and respective upward and longitudinal component vectors of said travel-path vector.

In embodiments, when door 102 is in an open state, it is positioned vertically above at least a portion of wheel well 106.

According to embodiments, there is provided a vehicle 101 having body 103, a door opening 105, a door 102, an arm assembly 110 connected to door 102 and to a wall 103 of body, and a wheel well 106. According to some embodiments, as shown in FIG. 2A, door opening 105 is located at a wall 104 defined at one side of body 103 in front of the wheel well 106, e.g. between the front edge of vehicle 101 and front wheel well 106, and arm assembly 110 is adapted to open door 102 by moving backward towards front wheel well 106. According to some embodiments (not shown), door opening 105 is located at a wall 104 defined at one side of body 103 behind wheel well 106, e.g. between the rear edge of vehicle 101 and rear wheel well 106, and opens by moving forward towards rear well 106.

According to some embodiments, at an open state, door 102 is positioned to be at least partially vertically above adjacent wheel well 106. In some embodiments, at the open state the bottommost edge of door 102 is positioned at least partially above the adjacent wheel well. In some embodiments, as shown for example in FIG. 2D, at the open state the bottommost edge of door 102 is positioned at least partially above the highest edge of the adjacent wheel well 106.

According to some embodiments, as shown for example in FIG. 2D, at the closed state the bottommost portion of door 102 is positioned below or at the same height of at least a portion of adjacent wheel well 106. In some embodiments, at the closed state the bottommost edge of door 102 is positioned below the highest edge of adjacent wheel well 106.

According to some embodiments, actuating the door to move between the open and closed state is by the arm assembly. In some embodiments, the arm assembly has one or more arms connected to the door. In some embodiments, the door has a door connector portion adapted to connect to the arm assembly. In some embodiments, the arm assembly is hinged to the door (or the door connector portion). In some embodiments, the arm assembly arm is hinged to the door.

According to some embodiments, actuating door 102 to move between door opening 105 and wheel well 106 is by arm assembly 110. In some embodiments, the arm assembly 110 has one or more arm assembly arms 112 connected to door 102. In some embodiments, door 102 has a door connector portion adapted to connect to arm assembly 110. In some embodiments, arm assembly is hinged to door 102 (or the door connector portion). In some embodiments, arm assembly arm 112 is hinged to door 102 with pivot connection 116. In some embodiments, arm assembly 110 constrains the movement of door 102 to be arcuate having a center of rotation below door 102. In some embodiments, arm assembly 110 constrains the movement of door 102 to be arcuate having a center of rotation adjacent to wheel well 106.

According to some embodiments, the majority of opening 105 is not blocked by door 102, when it is in an open state. In some embodiments, more than 75% of the opening area of opening 105 is not blocked by door 102, when it is in an open state. In some embodiments, more than 85% of the opening area of opening 105 is not blocked by door 102, when it is in an open state. In some embodiments, more than 95% of the opening area of opening 105 is not blocked by door 102, when it is in an open state. In some embodiments, door 102 at open state does not block opening 105.

The door of FIGS. 2A-2D is supported at one location (where the end 116 is pivotable attached to the door 102). In embodiments, it can be desirable for a door to be supported at two or more locations. For example, support at two locations can serve to maintain the orientation of the door when the door moves between a closed-door position and an open-door position. In a non-limiting example, a first portion of a door can be pivotably connected to an end of an arm assembly which in turn is anchored, e.g., pivotably anchored or fixedly anchored, to an interior wall surface of the vehicle; a second portion of a door can be slidably connected to a track or rail that is fixedly connected to an interior wall surface, which may or may not be the same interior wall surface.

Figure 3:
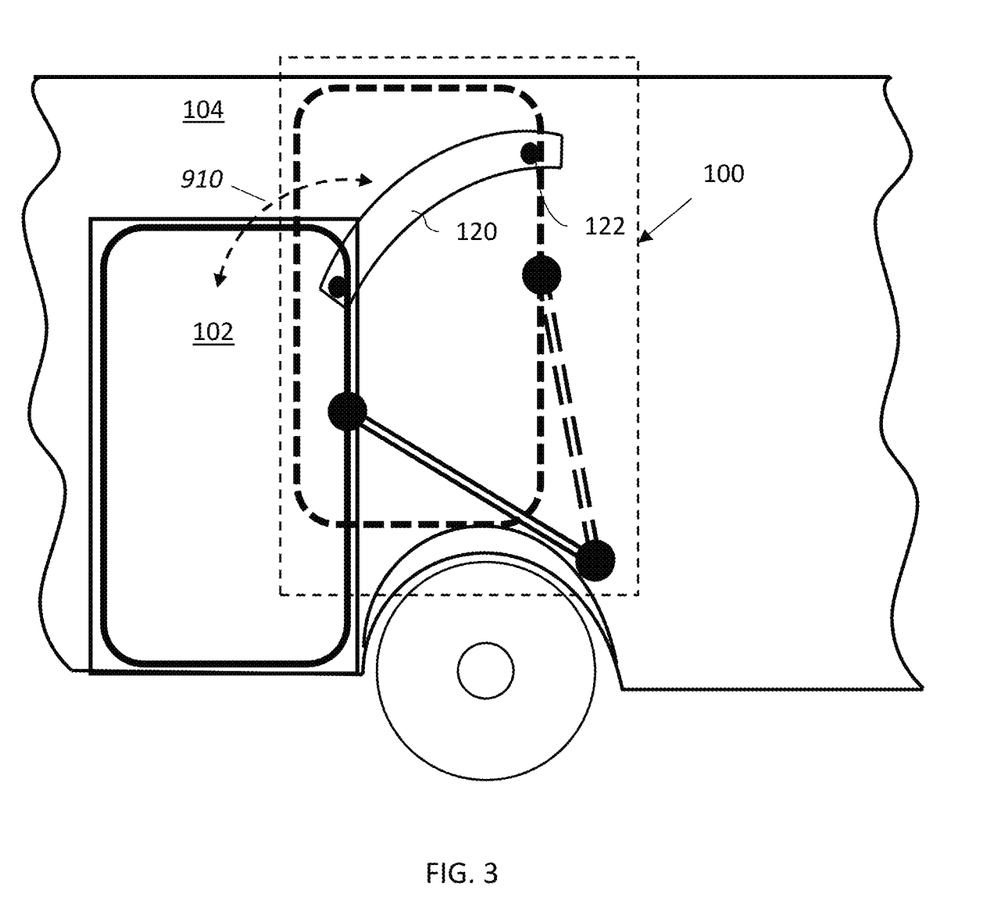
FIG. 3 is a schematic illustration showing a vehicle having a door assembly according to embodiments of the invention.

Reference is now made to FIG. 3, which schematically illustrates a side view of a portion of a vehicle and a door assembly according to some embodiments.

According to some embodiments, door assembly 100 includes one or more door rails 120, which support and guide door 102 during its movement between open and closed states. In some embodiments, door 102 has one or more rail connectors 122 to connect door 102 with the rail(s). In some embodiments, rail connectors 122 include a bearing to allow rolling of door connector 122 with respect to rail(s) 120. In some embodiments, rail 120 is positioned adjacent to the upper portion of door 102, e.g. between the vehicle ceiling and an upper portion of the door. In some embodiments, rail 120 is positioned adjacent to a bottom portion of door 102, e.g. between the vehicle floor and the bottom portion of the door 102. In some embodiments, rail 120 is connected to side wall 104 of body 103. In some embodiments, rail 120 is connected to side wall 104 of body 103 between door opening 105 and wheel well 106. In some embodiments, rail 120 is curved. In some embodiments, rail 120 is arcuate. In some embodiments, rail is angular with respect to a horizontal plane.

In embodiments, such as, for example, the embodiment illustrated in FIG. 3, the arrangement of the arm assembly 110 and of the rail 120 are effective to constrain movement of a door 102 along a travel path that does not impinge upon a door-exclusion zone.

According to some alternative embodiments, door rails 120 are assembled to the vehicle body (i.e. are not part of the door assembly), and door assembly 100 is coupled to vehicle body 103 to fit with door rails 120.

Figure 4:
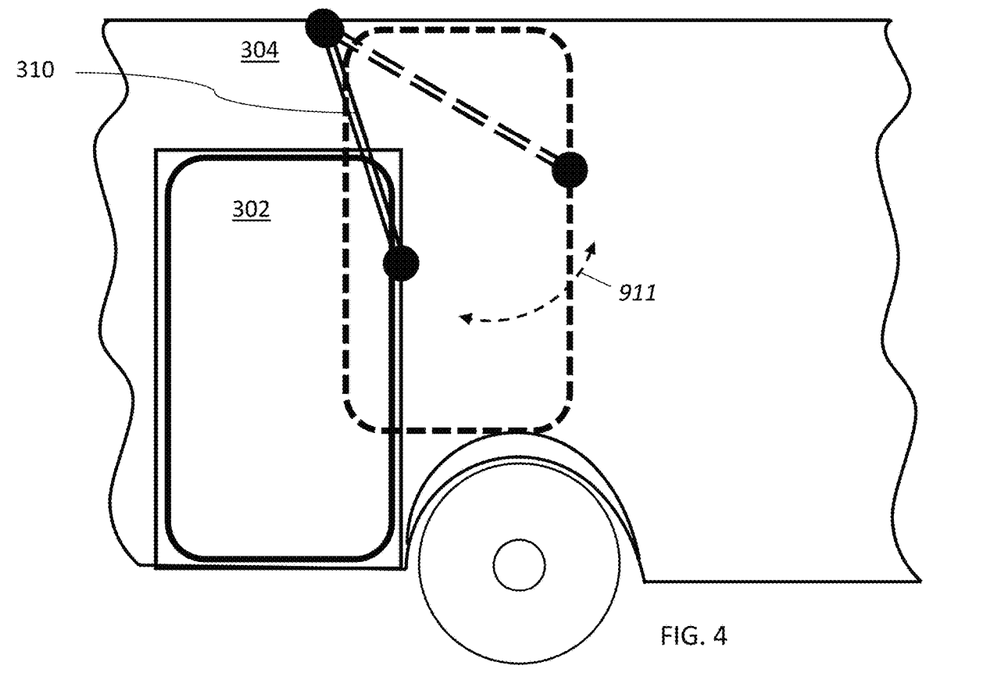
FIG. 4 is a schematic illustration showing a vehicle having a door assembly according to embodiments of the invention.

We now refer to FIG. 4 which schematically illustrates a side view of a portion of a vehicle and a door assembly according to some embodiments.

According to some embodiments, as shown in FIG. 4, arm assembly 310 may be adapted to be coupled to an upper portion of vehicle body 304. In some embodiments, arm assembly 310 is coupled to vehicle body 304 at a point which is above door 302. In some embodiments, arm assembly 310 constrains the movement of door 302 to be arcuate having a center of rotation above door 302.

Figure 5:
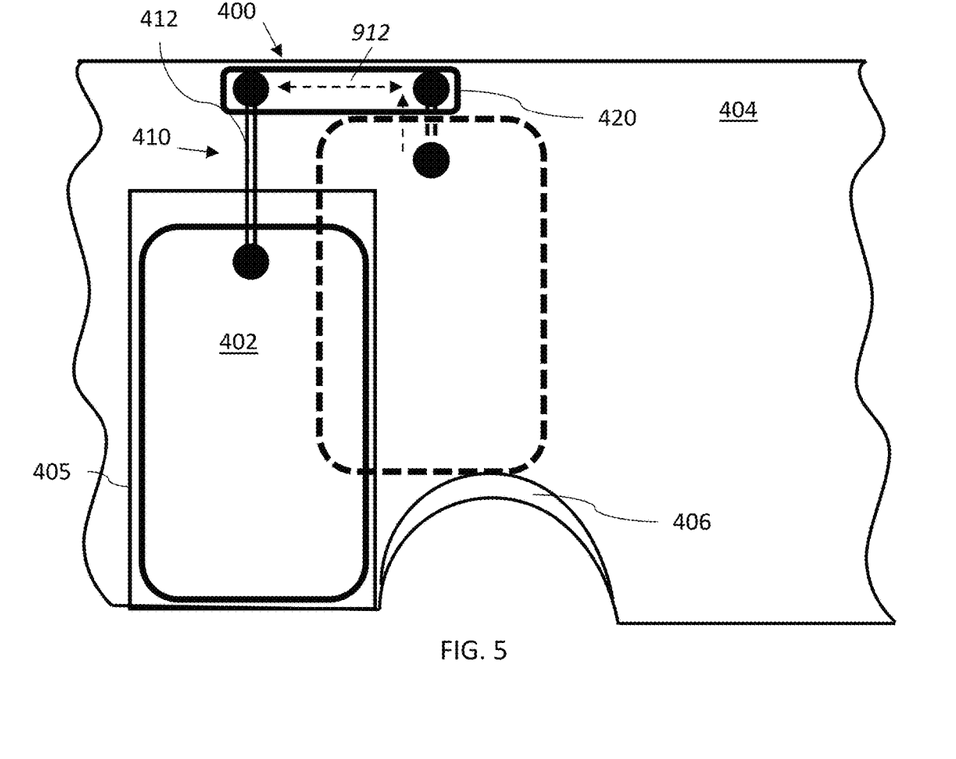
FIG. 5 is a schematic illustration showing a side view portion of a vehicle having a door assembly according to embodiments of the invention.

Reference is made to FIG. 5 which schematically illustrates a side view of a portion of a vehicle and a door assembly according to some embodiments.

According to some embodiment, as shown in FIG. 5, door assembly 400 includes arm assembly 410 and door rail 420. Arm assembly 410 and door rail 420 are assembled at an upper portion vehicle body 404. In some embodiments, arm assembly 410 is coupled to vehicle body 404 at a point which is above door 402. In some embodiments, door rail 420 is coupled to vehicle body 404 at a point which is above door 402. In some embodiments, door rail 420 constrain the movement of door 402 to be linear between door opening and wheel well.

According to some embodiments, arm assembly 410 includes an expanding/contracting arm coupled to door 402. In some embodiments, contracting the arm lifts door 402. In some embodiments, lifting of door 402 is to a level, which is above wheel well (e.g. bottom portion of door 402 is above the upper portion of wheel well 406). In some embodiments, a rail end of arm assembly arm 412 is coupled to rail 420, such as arm 412 can move in a path defined by rail 420. In some embodiments, moving arm 412 in rail 420, moves door 402 away of opening 405 and toward wheel well 406, thereby, moving door 402 between an open state and a closed state.

Figure 6A:
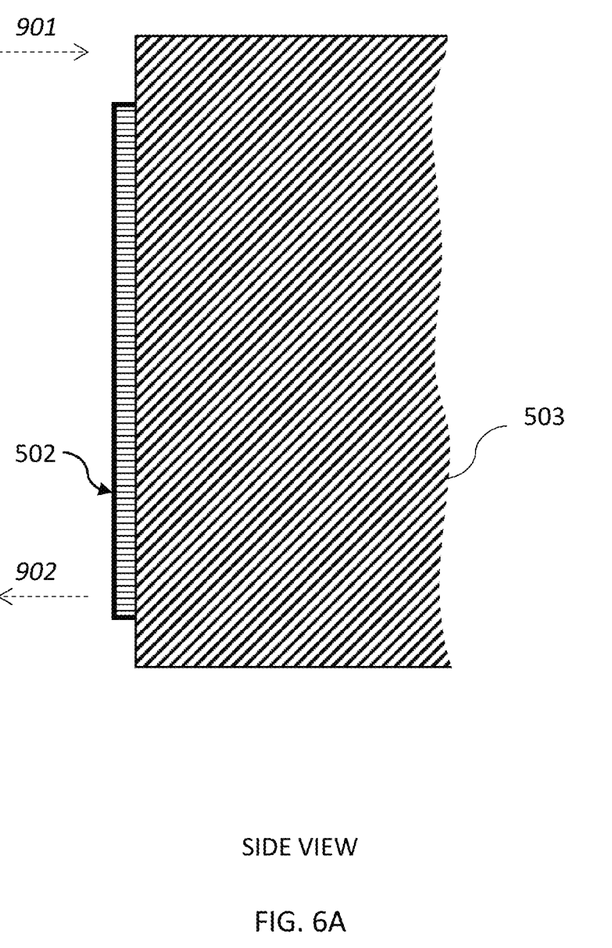
FIGS. 6A and 6B are schematic side and top views of a door within a door pocket, according to embodiments of the invention.
Figure 6B:
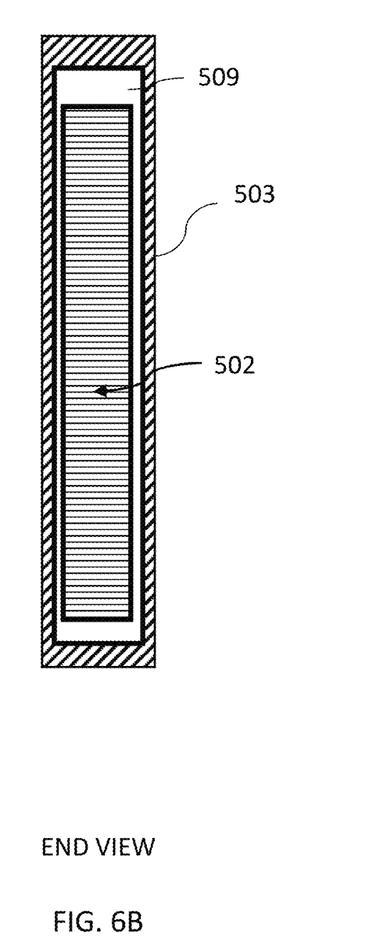

Referring now to FIGS. 6A and 6B, schematic side and longitudinal (e.g., end) views of a 'pocket door' 502 are shown. For purposes of illustration, the door 502 is shown as not being entirely within the door pocket 509 but it can, in some implementations be secured in an open-door position that is entirely within the door pocket 509. As indicated by arrow 901 in FIG. 6A, door 502 is moved, e.g., from a closed-door position to an open-door position, by sliding into a door pocket 509 constructed within (or coupled to) a side wall 503 of a vehicle. Similarly, arrow 902 indicates the direction of the door 502 being moved in the opposite direction, e.g., from an open-door position to an open-door position, by sliding into a door pocket 509 constructed within a side wall 503 of a vehicle. In some embodiments, a door pocket design includes the provision of one or more door assembly components such as arm assemblies and/or door rails, within the door pocket 509, specifically on one or more of the interior major surfaces of the door pocket 509.

Figure 7A:
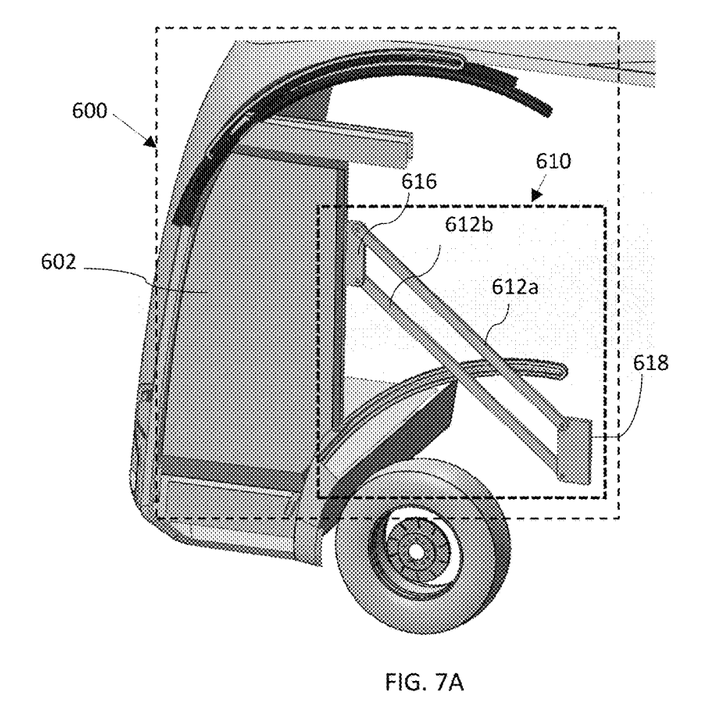
FIGS. 7A and 7B are schematic illustrations showing partial perspective and side views of a detail of a vehicle having a door assembly according to embodiments of the invention.
Figure 7B:
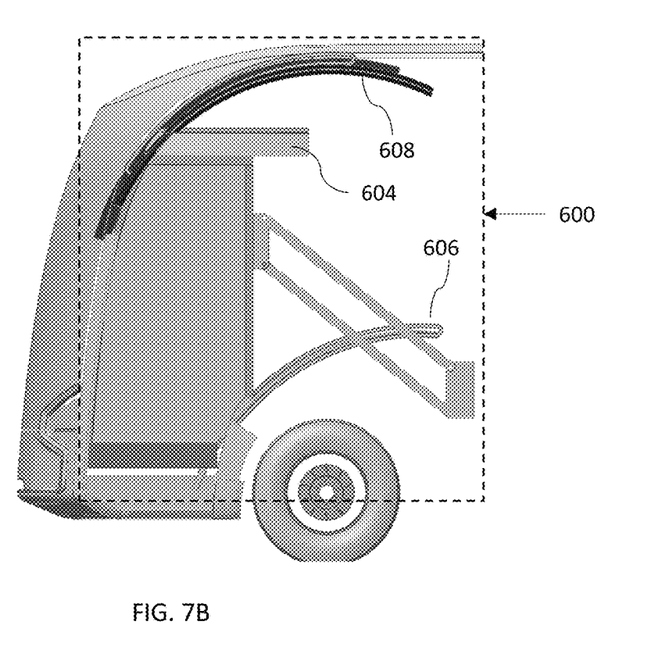

We now refer to FIGS. 7A and 7B, which illustrate a perspective and a side view of a door assembly according to some embodiments.

As shown in FIGS. 7A and 7B, arm assembly 610 has two arms 612*a*/612*b*, each rotatably coupled at one end to a door connector 616 and at another end to a body connector 618. Having two arms potentially allows constraining the degrees of freedom of the door during its movement, e.g. to maintain the angle of the door with respect to the body of the vehicle. A door end of each of the arms is pivotally coupled to the door connector 616 and a wall end of each of the arms is pivotally coupled to body connector 618. In some embodiments, arms 612*a*/612*b* are arranged to form a parallelogram.

According to some embodiments, as shown in FIGS. 7A-7B, door assembly 600 includes two rails—a bottom rail 606 and an upper rail 608—which support and guide door 602 during its movement between open and closed states.

Bottom rail 606 is positioned adjacent to a bottom portion of door 602, e.g. between the vehicle floor and the bottom portion of the door 602. Upper rail 608 is positioned adjacent to the upper portion of door 602, e.g. between the vehicle ceiling and an upper portion of the door. In some embodiments, bottom rail 606 and upper rail 608 are connected to the side wall of the vehicle body. In some embodiments, rails 606/608 are connected to side the wall of the body between the door opening and the wheel well. Rails 606/608 are curved to guide door 602 in a path which follows the curvature of the wheel well.

As shown in FIGS. 7A-7B, door assembly further includes a door bar 604. Door bar 604 may be used to constrain the lateral movement of door 602 with respect to the wall of the vehicle body. In some embodiment, the movement of a door between a closed-door position and an open-door position, i.e., in either or both directions, is substantially constrained to a plane. In some embodiments, the movement along a plane is substantially absent any movement that is orthogonal to the plane, and in some such embodiments the door bar 604 is provided for, inter alia, preventing such orthogonal movement and/or constraining the movement to the plane.

Figure 8A:
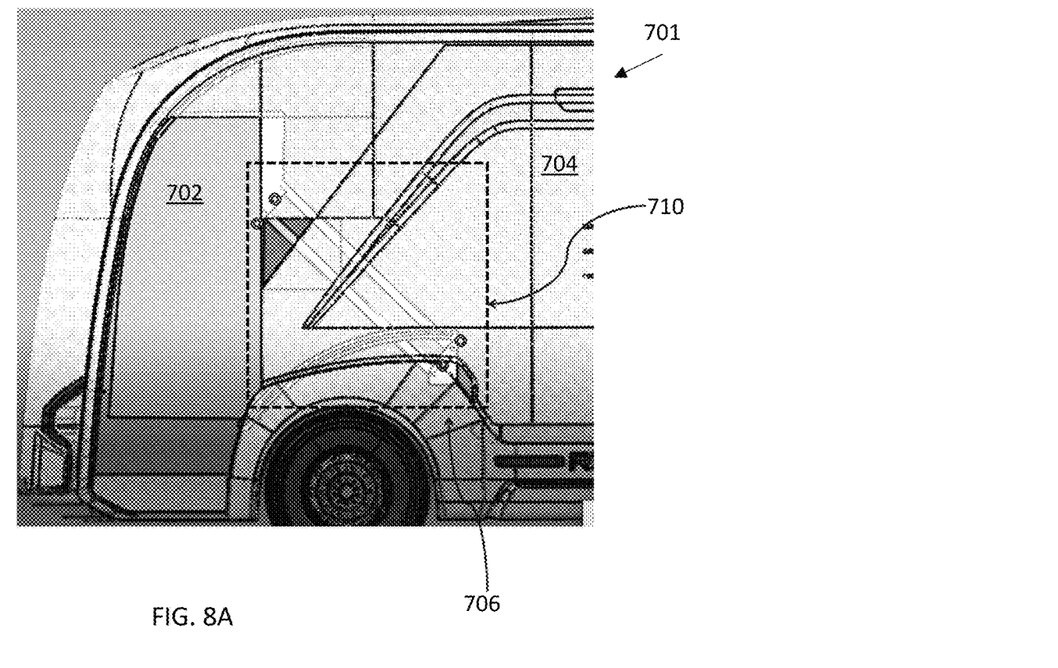
FIGS. 8A, 8B and 8C are schematic illustrations illustrating a door in successive positions along a travel-path, according to embodiments of the invention.
Figure 8B:
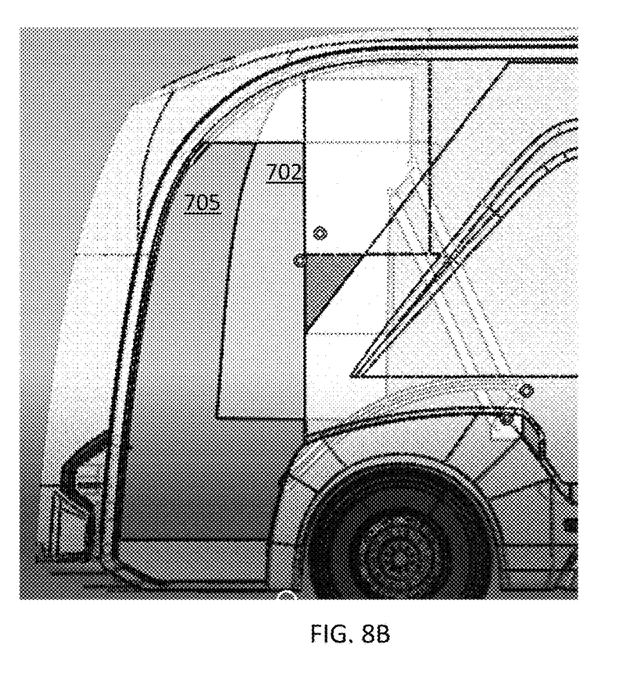
Figure 8C:
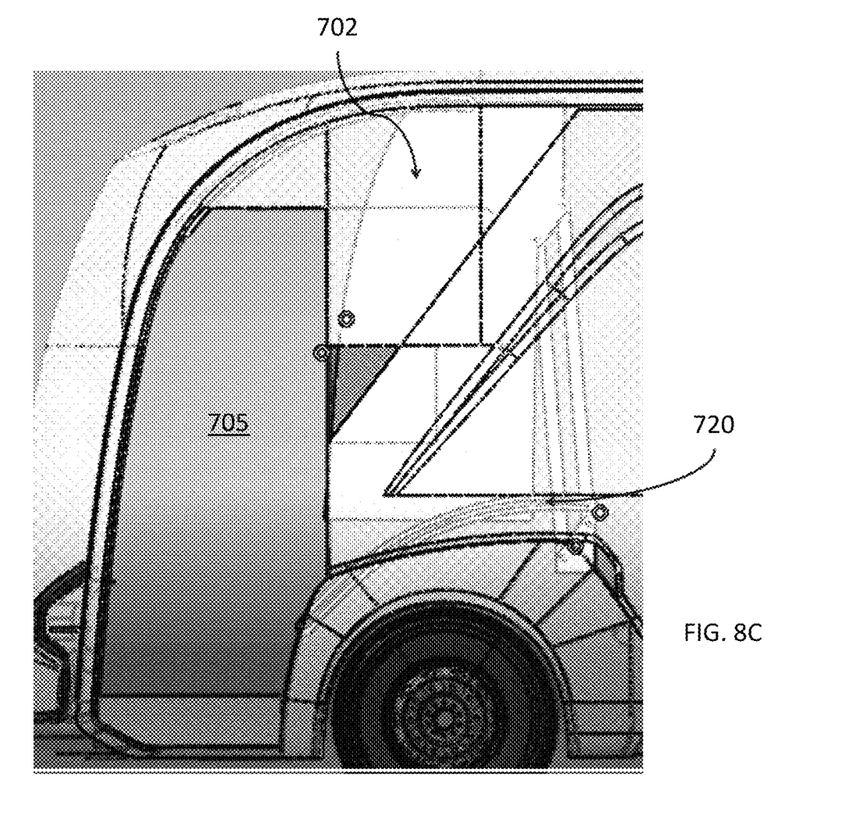

Reference is now made to FIGS. 8A to 8C, which illustrate 'snapshot' views of a door assembly in a vehicle at different, sequential moments in time.

According to some embodiments, the side wall of the vehicle body has an outside wall layer and an inside wall layer to form a door pocket. In some embodiments, the door is sandwiched between the outside and inside wall layers. In some embodiments, the door at the open position is sandwiched between the outside and inside wall layers. In some embodiments, the arm assembly is at least partially sandwiched between the outside and inside wall layers. In some embodiments, the majority of the arm assembly is sandwiched between the outside and inside wall layers. In some embodiments, at least one door rail is sandwiched between the outside and inside wall layers. Components of the arm assembly can be fixedly and/or pivotably connected to any interior surface of the door pocket. Similarly, door rail(s) can be connected to an interior surface of the door pocket, such as one of the two major interior surfaces.

According to some embodiments, as shown for example in FIGS. 8A-8C, door 702 at the open position is positioned inside vehicle 701, e.g. next/abutting an inside facing body wall surface 704. In some embodiments, arm assembly 710 is connected to an inside facing body wall surface 704. In some embodiments, at least one door rail 720 is connected to an inside facing body wall surface 704.

According to some embodiments, wall 704 comprises a door section shaped to accommodate door 702 at fully open state without having a door inside facing surface protruding inside the vehicle body further than wall 704 at portions of wall 704 adjacent to the door section.

According to some embodiments, the majority of entrance 705 is not blocked by door 702, when it is in an open state. In some embodiments, more than 75% of the opening area of entrance 705 is not blocked by door 702, when it is in an open state. In some embodiments, more than 85% of the opening area of entrance 705 is not blocked by door 702, when it is in an open state. In some embodiments, more than 95% of the opening area of entrance 705 is not blocked by door 702, when it is in an open state. In some embodiments, door 702 at open state does not block entrance 705.

According to some embodiments, the door arm assemblies embodiments disclosed elsewhere herein may be operated manually. In some embodiments, the door arm assemblies disclosed elsewhere herein operate to move the door using one or more of electrical/pneumatic/hydraulic actuators.

According to some embodiments, the vehicle disclosed in one or more of the embodiments has two or more wheels. In some embodiments, vehicle is one of: a commercial vehicle, a passenger vehicle, for public transportation. In some embodiments, vehicle is a train/trolly. In some embodiments, the vehicle has a driver door in front of the front wheel.

Figure 9A:
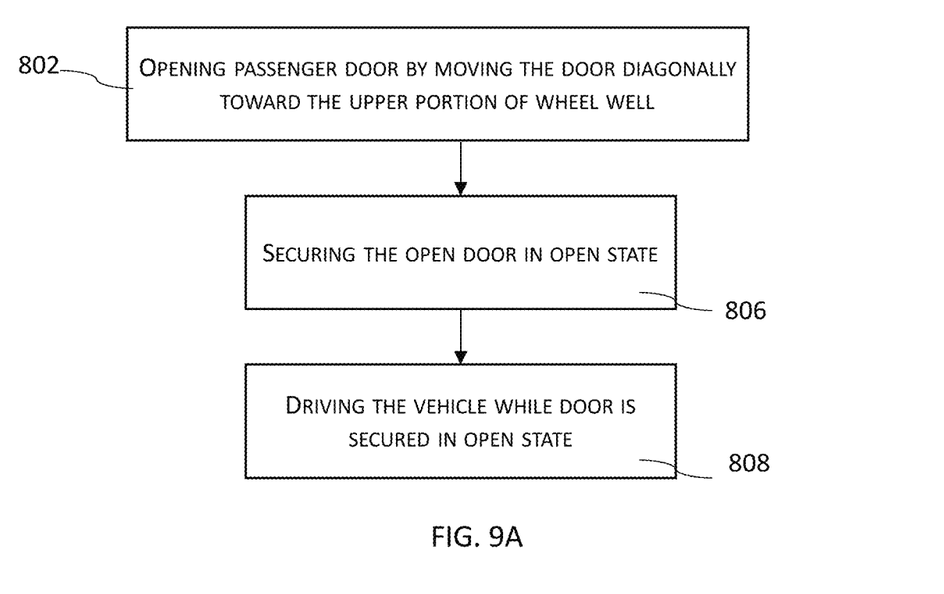
FIGS. 9A and 9B show flowcharts of methods for operating a door assembly, according to according to embodiments of the invention.
Figure 9B:
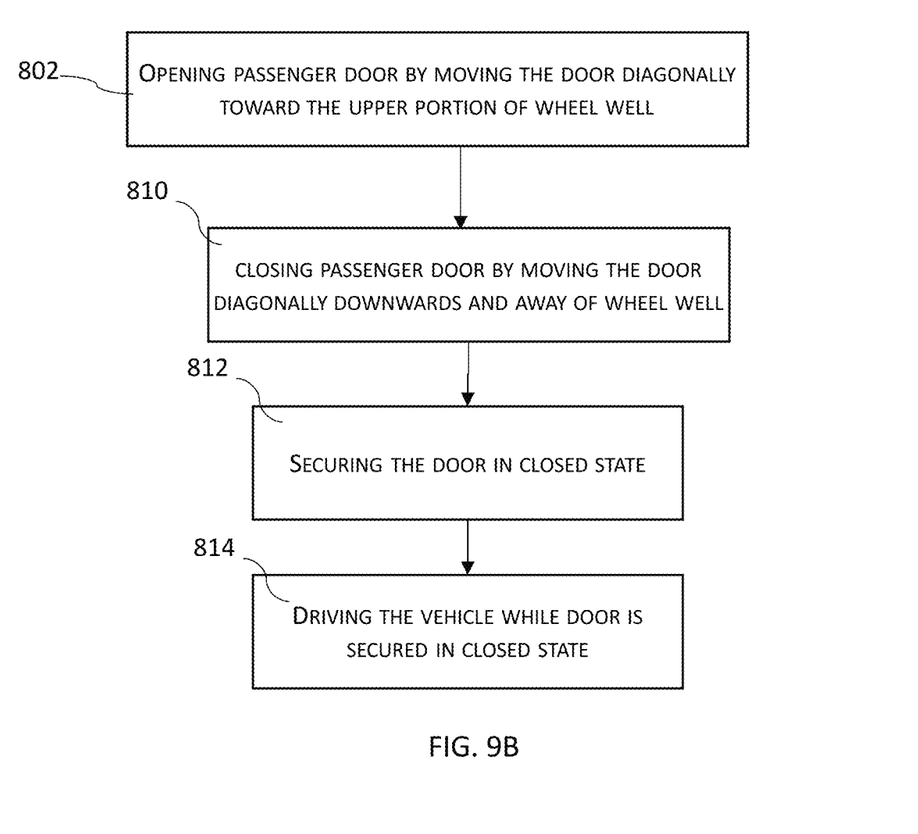

Reference is now made to FIGS. 9A and 9B, which illustrate exemplary embodiments of a method for operating a door assembly provided using the door assembly components disclosed in the embodiments elsewhere herein. As shown in the respective flowcharts of FIGS. 9A and 9B, operating the door assembly includes the following steps:

Opening 802 passenger door by moving the door diagonally toward the upper portion of wheel well. In some embodiments, diagonally refers to be arcuately.

Entering 804 through the door opening when the door is in open state. Entering 804 is optional if entering the vehicle 804 is not required, e.g., when the vehicle operator is already onboard and opens the door from within, or when the opening 802 is for servicing purpose, or for using the door opening/entrance for different purpose.

Securing 806 the open door in open state. Securing 806 optional if securing 806 is not required for further usage of the vehicle.

Driving 808 the vehicle while door is secured in open state.

It should be noted that the order of steps 802-808 can be changed. For example. driving 808 the vehicle prior to securing 806.

According to some embodiments, operating the door assembly includes the following steps:

Closing 810 passenger door by moving the door diagonally downwards and away of wheel well. In some embodiments, diagonally refers to be arcuately.

Securing 812 the door in closed state. Driving 814 the vehicle while door is secured in open state.

Any of the steps of the methods can be combined to describe a method within the scope of the present disclosure.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise.

The invention claimed is:

1. A vehicle comprising:
    a. a side wall shaped to define a door opening and a door-exclusion zone, the door-exclusion zone comprising at least one of a wheel well, a cargo compartment and an air conditioner, the door-exclusion zone having a maximum height that is higher than a bottom edge of the door opening and lower than a top edge of the door opening;
    b. a rail joined to a major surface of the side wall;
    c. an arm assembly pivotably anchored at a first end thereof to the side wall; and
    d. a door having a closed-door position aligned with the door opening, a first portion of the door being slidably engaged with the rail and a second portion of the door being pivotably coupled to a second end of the arm assembly, the arm assembly and the rail being arranged to constrain movement of the door between the closed-door position and an open-door position higher in its entirety than the door-exclusion zone in its entirety, to a travel-path that does not impinge upon the door-exclusion zone,
    wherein the door movement constrained to the travel-path includes, in a door-opening mode, an upward vector and a longitudinal vector toward the door-exclusion zone, and in a door-closing mode, a downward vector and a longitudinal vector away from the door-exclusion zone.

2. A vehicle comprising:
    a. a side wall shaped to define a door opening and a door-exclusion zone, the door-exclusion zone comprising at least one of a wheel well, a cargo compartment and an air conditioner, the door-exclusion zone having a maximum height that is higher than a bottom edge of the door opening and lower than a top edge of the door opening;
    b. a rail joined to a major surface of the side wall;
    c. an arm assembly pivotable anchored at a first end thereof to the side wall; and
    d. a door having a closed-door position aligned with the door opening, a first portion of the door being slidably engaged with the rail and a second portion of the door being pivotably coupled to a second end of the arm assembly, the arm assembly and the rail being arranged to constrain movement of the door between the closed-door position and an open-door position higher in its entirety than the door-exclusion zone in tis entirety, to a travel-path that does not impinge upon the door-exclusion zone, wherein the door opening is disposed between the door-exclusion zone and an end of the vehicle nearest the to the door-exclusion zone, and the door movement constrained to the travel-path includes, in a door-opening mode, a longitudinal vector away from the end of the vehicle nearest to the door-exclusion zone.

3. A vehicle comprising:
   a. a side wall shaped to define a door opening and a door-exclusion zone, the door-exclusion zone comprising at least one of a wheel well, a cargo compartment and an air conditioner, the door-exclusion zone having a maximum height that is higher than a bottom edge of the door opening and lower than a top edge of the door opening;
   b. a rail joined to a major surface of the side wall;
   c. an arm assembly pivotable anchored at a first end thereof to the side wall; and
   d. a door having a closed-door position aligned with the door opening, a first portion of the door being slidably engaged with the rail and a second portion of the door being pivotably coupled to a second end of the arm assembly, the arm assembly and the rail being arranged to constrain movement of the door between the closed-door position and an open-door position higher in its entirety than the door-exclusion zone in tis entirety, to a travel-path that does not impinge upon the door-exclusion zone, wherein the side wall is formed to include a door pocket therewithin, the major surface is a major internal surface of the door pocket, and the arm assembly is pivotably anchored at a first end thereof within the door pocket.

4. The vehicle of claim 3, wherein the travel-path is disposed entirely within a volume consisting of the door-frame and the door pocket.

5. A method of operating a vehicle, the vehicle comprising: (i) a side wall shaped to define a door opening and a door-exclusion zone comprising at least one of a wheel well, a cargo compartment and an air conditioner, the door-exclusion zone having a maximum height that is higher than a bottom edge of the door opening and lower than a top edge of the door opening, (ii) a rail joined to a major surface of the side wall, (iii) an arm assembly pivotably anchored at a first end thereof to the side wall, and (iv) a door comprising a first portion slidably engaged with the rail and a second portion pivotably coupled to a second end of the arm assembly, the method comprising:
   a. opening the door by moving the door from a closed-door position aligned with the door opening to an open-door position higher in its entirety than the door-exclusion zone in its entirety, along a travel-path constrained by arrangement of the arm assembly and rail to avoid impingement upon the door-exclusion zone; and
   b. closing the door by moving the door along the travel-path from the open-door position to the closed-door position, wherein (i) the closing includes (A) moving the door in a downward vector and (B) moving the door in a lateral vector away from the door-exclusion zone, and (ii) the opening includes: (A) moving the door in an upward vector and (B) moving the door in a lateral vector toward the door-exclusion zone.

6. A method of operating a vehicle, the vehicle comprising: (i) a side wall shaped to define a door opening and a door-exclusion zone comprising at least one of a wheel well, a cargo compartment and an air conditioner, the door-exclusion zone having a maximum height that is higher than a bottom edge of the door opening and lower than a top edge of the door opening, (ii) a rail joined to a major surface of the side wall, (iii) an arm assembly pivotably anchored at a first end thereof to the side wall, and (iv) a door comprising a first portion slidable engaged with the rail and a second portion pivotably coupled to a second end of the arm assembly, the method comprising:
   a. opening the door by moving the door from a closed-door position aligned with the door opening to an open-door position higher in its entirety than the door-exclusion zone in its entirety, along a travel-path constrained by arrangement of the arm assembly and rail to avoid impingement upon the door-exclusion zone; and
   b. closing the door by moving the door along the travel-path from the open-door positon to the closed-door position, wherein the side wall is formed to include a door pocket therewithin, the major surface is a major internal surface of the door pocket, and the arm assembly is pivotably anchored at a first end thereof within the door pocket.

7. The method of claim 6, wherein the travel-path is disposed entirely within a volume consisting of the door-frame and the door pocket.

* * * * *